United States Patent [19]

Pope et al.

[11] 4,264,451
[45] Apr. 28, 1981

[54] WATER PURIFICATION METHOD

[75] Inventors: Theodore C. Pope, Orlando; Richard A. Dunham, Casselberry, both of Fla.

[73] Assignees: City of Orlando; Orlando Utilities Commission, both of Orlando, Fla.

[21] Appl. No.: 97,271

[22] Filed: Nov. 26, 1979

Related U.S. Application Data

[63] Continuation of Ser. No. 908,119, May 22, 1978, abandoned.

[51] Int. Cl.$^3$ ............................................... C02F 1/76
[52] U.S. Cl. .................................. 210/721; 210/754; 210/763
[58] Field of Search .................. 210/28, 29, 39, 50, 210/62, 63 R, 665, 694, 721, 754, 763

[56] References Cited

U.S. PATENT DOCUMENTS

| | | | |
|---|---|---|---|
| 3,017,347 | 1/1962 | Kratz | 210/50 X |
| 3,192,156 | 6/1965 | Joyce | 210/39 X |
| 3,276,186 | 10/1966 | Hronas et al. | 210/39 X |
| 3,867,509 | 2/1975 | Geiger et al. | 210/62 X |
| 4,077,879 | 3/1978 | Smeck | 210/63 R |

OTHER PUBLICATIONS

Van Kleeck, "The Functions of Sewage Chlorination," *Wastes Engineering*, Jun. 1956, Reprint.

*Primary Examiner*—Thomas G. Wyse
*Attorney, Agent, or Firm*—Duckworth, Hobby, Allen & Pettis

[57] ABSTRACT

Hydrogen sulfide is effectively removed from potable water by the combined action of first chlorinating the water and then passing the chlorinated water through a bed of activated carbon. Chlorine is added in large doses to potable water containing dissolved hydrogen sulfide to convert substantially 90% of the hydrogen sulfide to sulfates. The chlorinated water containing residual hydrogen sulfide is then passed through a bed of activated carbon. Chemisorbed nascent oxygen in conjunction with the activated carbon catalytically affect breakdown of the remaining sulfide compounds into elemental sulfur.

13 Claims, No Drawings

WATER PURIFICATION METHOD

This is a continuation of application Ser. No. 908,119 filed May 22, 1978, now abandoned.

BACKGROUND OF THE INVENTION

1. Field of the Invention

The present invention is directed to a method for efficiently and economically removing dissolved hydrogen sulfide frequently found in potable water. The method involves first chlorinating the water with chlorine to convert about 90% of the hydrogen sulfide to sulfates, and then passing the chlorinated water through a bed of activated carbon whereby the remaining about 10% hydrogen sulfide will be catalytically converted into elemental sulfur.

2. Background of the Invention

Hydrogen sulfide is formed in water bodies by the decomposition of organic material under anaerobic conditions. The resulting hydrogen sulfide imparts the familiar odor of rotten eggs to the water and a "sulfur-like" taste. While many people drink "sulfur water" because it is the only water available, it is not generally regarded as acceptable to the public. In addition, it has been determined that the reaction of sulfide and normal water plant chlorine dosages causes an even more intense taste and odor problem in the potable water distribution system.

The most common method available today for sulfide removal is aeration of the raw water by one of several available techniques. However, aeration of "sulfur water" involves numerous inherent problems. Perhaps most important, aeration at best is only 50-60% efficient, thereby allowing untreated sulfides to enter the storage reservoir or distribution system. Additionally, as a necessary adjunct to the aeration process, hydrogen sulfide gas is released into the surrounding atmosphere causing a pollution problem and, possibly, problems relating to toxicity. Finally, hydrogen sulfide that is not removed in the aeration process enters the storage and distribution system resulting in rapid growth of sulfide-reducing bacteria comprised mainly of Beggiatoa Albans. Not only are these growths aesthetically unacceptable, but also they result in clogging of storage and distribution systems.

While it is well known in the field of water treatment to utilize procedures and apparatus for chlorinating potable water and also for filtering the water prior to storage and distribution, virtually no teachings are available concerning such a process for the effective removal of hydrogen sulfide. In fact, as stated above, modern chlorination and aeration treatment actually aggravates the odor and taste problems associated with "sulfur water." Furthermore, such modern treatment processes are directed to sterilizing the water or removing organic contaminants therefrom. For example, U.S. Pat. No. 3,733,266 discloses a process for oxidizing ammonia in municipal wastewater using breakpoint chlorination followed by passing the treated wastewater across a carbon adsorption zone. U.S. Pat. No. 3,252,899, teaches the use of an activated carbon filter in a process for removing organic contaminants from water. U.S. Pat. No. 1,771,518, also teaches the use of chlorine and a carbon bed filter in a process for disinfecting water. Additional examples of the current state of the art with regard to both processes and filtration devices and techniques are shown in the following U.S. Letters Patent:

| | |
|---|---|
| 2,238,896 | Gibbons |
| 2,605,901 | Morrison, et al |
| 2,633,990 | Simpson, et al |
| 3,337,454 | Gruenwald |
| 3,835,038 | Heaney |
| 3,915,857 | Olson |
| 3,928,197 | Horan, et al |
| 3,932,278 | Meidl, et al |
| Re. 27,275 | Dajani |

However, none of the above teachings are specifically concerned with the unique problems set forth above with regard to the removal of dissolved hydrogen sulfide from potable water.

With the advent of a public consciousness concerning environmental pollution as well as the quality of our drinking water, aeration is no longer a desirable method for hydrogen sulfide removal. It is therefore clear that there is a great need in the art for a method which would eliminate the hydrogen sulfide without exposing the water to the ambient atmosphere. Such a process should be simple in design, operation and cost-effectiveness while requiring minimal operating tolerances. Of course, in order to be truly effective the process should remove substantially 100% of the dissolved hydrogen sulfide content.

SUMMARY OF THE INVENTION

Dissolved hydrogen sulfide dissociates in water to form three separate species: $H_2S$; $HS^-$ and $S^=$. At a low pH, less than three, the $H_2S$ form dominates. At a pH of approximately nine, the $HS^-$ species prevails, and at a pH greater than ten the $S^=$ form is predominant. The equations for hydrogen sulfide dissociation in water are as follows:

$$H_2S \rightleftharpoons H^+ + HS^- \tag{1}$$

$$HS^- \rightleftharpoons H^+ + S^= \tag{2}$$

The method of the present invention makes use of these known dissociation species of hydrogen sulfide to convert the vast majority of the sulfide into sulfate by chlorination. Residual sulfide is catalytically converted to elemental sulfur by passing the chlorinated water through an activated carbon bed. In 1950 Dr. James B. Goodson demonstrated the potential of using chlorine to oxidize sulfide to sulfate. Equations (3) and (4) below represent the stoichiometric relationship of chlorine and sulfide:

$$Cl_2 + S^= \rightarrow 2Cl^- + S^\circ \tag{3}$$

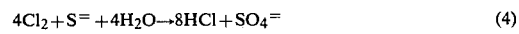
$$4Cl_2 + S^= + 4H_2O \rightarrow 8HCl + SO_4^= \tag{4}$$

Equations (3) above is undesirable in potable water treatment in that the end product is elemental sulfur which causes the water to have milky appearance. Additionally, the elemental sulfur may reconvert to hydrogen sulfide in the distribution system. Accordingly, equation (4), with a theoretical chlorine to sulfide ratio of 8:1, was chosen for further testing. These subsequent tests revealed an actual ratio of chlorine to sulfide of 12:1 gave more efficacious results. It was also determined that no matter how the parameters of the studies were adjusted, no more than about 92% of the sulfide content was removed. Clearly, then, this left at least 8% of the original sulfide to enter the reservoir and distribution system; therefore, the growth of the sulfide-reducing bacteria was slowed but not eliminated.

Studies and tests were next directed to elimination of this residual sulfide content after chlorination. In these studies the chlorinated, or superchlorinated, water was passed through a bed of activated carbon. Results of these studies led to the conclusion that the sulfide was not actually being adsorbed on the surface of the carbon, but was being catalyzed by the carbon and residual chlorine to elemental sulfur. The following equations support this conclusion:

$$C + HOCl \rightarrow C[O] + HCl \qquad (5)$$

$$H_2S + C[O] \rightarrow H_2O + S^\circ + C \qquad (6)$$

However, after several days of operation a noticeable head loss of fluid flow across the activated carbon bed was observed. Closer examination revealed that the top layer of carbon granules were actually cemented together. What was thought to be simply elemental sulfur was discovered to in fact comprise profuse growths of sulfide-reducing bacteria on the carbon surface. After numerous attempts to control the growth of bacteria failed, it was discovered that a gentle "bumpwashing" through the backwash system once a day was sufficient to keep the bed surface disturbed and free flowing. Frequent full scale backwashes were not necessary, and experimental evidence indicated that a thorough backwash at about two month intervals would maintain the efficacy of the catalytic activated carbon bed. It is to be understood that both the bumpwash and backwash are preferably conducted utilizing the finished water obtained as a result of this method.

Testing of finished water revealed that treatment in accord with the method outlined above removed substantially 100% of the dissolved hydrogen sulfide. It can thus be seen that the method of this invention will result in substantially complete elimination of hydrogen sulfide from potable water, thereby eliminating the associated taste and odor problems. It should also be noted that this method is preferably conducted in a closed system thereby eliminating pollution and toxicity problems associated with state of the art aeration processes for removing hydrogen sulfide. From an economic point of view it is also noteworthy that the method of this invention is not dependent upon precise limiting tolerances, pH control, mixing procedures, or thermal regeneration of the catalytic carbon bed.

The invention accordingly comprises the several steps and the relation of one or more of such steps with respect to each of the others thereof, which will be exemplified in the method hereinafter disclosed, and the scope of the invention will be indicated in the claims.

DETAILED DESCRIPTION

The present invention relates to a method for effectively removing substantially all of the dissolved hydrogen sulfide content from a source of potable water. As will be set forth in greater detail below, the invention comprises chlorinating the water and then passing the chlorinated water through a bed of activated carbon. Initial chlorination converts about 90% of the sulfides to sulfates. A catalytic reaction takes place as the chlorinated water passes through the activated carbon bed, removing substantially all of the remaining sulfide as elemental sulfur. The invention further comprises means for controlling the growth of sulfide-reducing bacteria on the catalytic carbon bed so as to maintain a relatively constant flow through the system.

However, before presenting detailed examples of the present method below, certain characteristics with regard to the system's construction and operation should be noted. Raw, potable water was obtained from wells and included a dissolved hydrogen sulfide content ranging from 0.1–6.0 mg/l. Gaseous chlorine was fed into the stream of raw water by conventional chlorinating equipment at a point just prior to the activated carbon column. The tank containing the activated carbon was fabricated from reinforced plastic and measured about nine feet by fourteen feet. Backwashing facilities were provided. The turbidity and sulfide content of the finished water was continuously monitored.

During the course of experimentation two different activated carbon materials were utilized. In one series of tests a thirty six inch bed of Hydrodarco 1030, a lignite-based granular activated carbon supplied by ICI United State, Inc. was utilized. It was supported on a six inch layer of river rock that rested, in turn, on a support plate. In another series of tests a twenty four inch bed of Filtrasorb 300, a denser granular activated carbon prepared from bituminous coal and supplied by Calgon Corporation, was utilized. The Hydrodarco 1030 exhibits a total surface area of about 650 square meters per gram of carbon, while the Filtrasorb 300 exhibits a total surface area of about 950–1050 square meters per gram of carbon.

As briefly mentioned above, significant growth of sulfide-reducing bacteria on the surface of the carbon bed was noted, causing undesirable head loss across the bed. This problem was solved by implementing a procedure previously identified as "bumpwashing." As used herein, that term signifies a slight bump of water through the carbon bed using the system's backwash facility. Acceptable results have been obtained by bumpwashing at the rate of about two gallons per minute per square foot of carbon bed surface area for about five minutes once a day. Finished water may be utilized as the bump wash medium. The sulfide-reducing bacteria will continue to grow, but the daily bumpwash prevents cementing together of the carbon granules.

Finally, because the activated carbon bed acts as a catalyst rather than an adsorber, thermal regeneration was not necessary. Experimental data indicates that a thorough back-washing with finished water about once every two months will maintain the bed in good condition with an expected life for the bed of at least one year.

The following examples, then, are set forth in order to more fully describe the method of the present invention.

EXAMPLE I

Raw, potable well water was pumped from the well head to the system. Gaseous chlorine was fed by conventional chlorinating equipment into the raw well water line just prior to the activated carbon column. At this point the reaction between the chlorine and hydrogen sulfide takes place substantially instantaneously according to the following equations:

$$Cl_2 + H_2O \rightarrow HOCl + HCl \qquad (7)$$

$$4HOCl + H_2S \rightarrow H_2SO_4 + 4HCl \qquad (8)$$

Approximately 90% of the hydrogen sulfide was thereby converted to sulfates.

The theoretical ratio of chlorine to sulfide of 8:1, as established by equation (4), above, proved to be somewhat low, most probably due to other substances in the water having a demand for chlorine. Use of this low ratio yielded a turbid finished product. While a variety of chlorine to sulfide ratios were actually utilized, as will be set forth below, a ratio of 12:1 was found to give quite acceptable results.

The chlorinated water was then passed through the activated carbon bed. The excess free chlorine reacts with carbon to form nascent oxygen, and the nascent oxygen is chemisorbed onto the carbon's surface. This in turn reacts with the remaining hydrogen sulfide to form elemental sulfur as previously set forth in equations (5) and (6). The finished, substantially hydrogen sulfide-free water was then directed to the reservoir or distribution system.

The resulting finished water exhibited a sulfide content of less than 0.1 mg/l and was of acceptable clarity. Head loss across the activated carbon bed was controlled by daily bump-washing with finished water. A thorough backwashing with finished water was applied at two month intervals.

EXAMPLE II

Presented below are operating results of a control system conducted in accord with the method of this invention as heretofore set forth.

| Carbon Bed | |
|---|---|
| Type | Hydrodarco |
| Depth, in. | 24 |
| Duration, days | 4.1 |
| Flow rate, gpm average | 603 |
| Head Loss, ft. of water, avg. | — |
| Influent analysis, avg. | |
| pH value | 7.80 |
| Sulfide, mg/l | 1.97 |
| Chlorine dosage, mg/mg Sulfide, avg. | 19.7 |
| Sulfide at top of bed, mg/l, avg. | 0.1 |
| Daily bumpwash | |
| Rate, gpm/sq. ft. | 6.3 |
| Duration, min. | 5.0 |
| Head loss decrease, ft., avg. | — |
| Pressure increase, psig, avg. | 0.3 |
| Flow increase, gpm, avg. | 24 |
| Effluent analysis, avg. | |
| pH value | 6.24 |
| Sulfide, mg/l | less than 0.1 |
| Turbidity (Hach), NTU | 0.16 |

EXAMPLE III

Presented below are operating results of a control system conducted in accord with the method of this invention as heretofore set forth.

| Carbon Bed | |
|---|---|
| Type | Hydrodarco |
| Depth, in. | 24 |
| Duration, days | 4.0 |
| Flow rate, gpm avg. | 616 |
| Head Loss, ft. of water, avg. | — |
| Influent analysis, avg. | |
| pH value | 7.82 |
| Sulfide, mg/l | 1.4 |
| Chlorine dosage, mg/mg Sulfide, avg. | 13.2 |
| Sulfide at top of bed, mg/l, avg. | 0.23 |
| Daily bumpwash | |
| Rate, gpm/sq. ft. | 6.3 |
| Duration, min. | 5.0 |
| Head loss decrease, ft., avg. | — |
| Pressure increase, psig, avg. | 0.2 |
| Flow increase, gpm, avg. | 17 |
| Effluent analysis, avg. | |
| pH value | 6.77 |
| Sulfide, mg/l | less than 0.1 |
| Turbidity (Hach), NTU | 1.24 |

EXAMPLE IV

Presented below are operating results of a control system conducted in accord with the method of this invention as heretofore set forth.

| Carbon Bed | |
|---|---|
| Type | Filtrasorb |
| Depth, in. | 24 |
| Duration, days | 10.2 |
| Flow rate, gpm, avg. | 639 |
| Head loss, ft. of water, avg. | 1.48 |
| Influent analysis, avg. | |
| pH value | 7.79 |
| Sulfide, mg/l | 0.76 |
| Chlorine dosage, mg/mg Sulfide, avg. | 24.8 |
| Sulfide at top of bed, mg/l, avg. | less than 0.1 |
| Daily bumpwash | |
| Rate, gpm/sq. ft. | 6.3 |
| Duration, min. | 5.0 |
| Head loss decrease, ft., avg. | 0.09 |
| Pressure increase, psig, avg. | — |
| Flow increase, gpm, avg. | 5 |
| Effluent analysis, avg. | |
| pH value | 6.75 |
| Sulfide, mg/l | less than 0.1 |
| Turbidity (Hach), NTU | 0.12 |

As previously stated, it is to be remembered that the above method is preferably conducted in a closed system, thereby preventing the water from any contact with outside atmosphere thus maintaining its bacteriological integrity while at the same time eliminating pollution and toxicity problems. It is also to be noted that so long as the chlorine to sulfide ratios set forth above are maintained, no additional process controls with regard to pH, etc., are required.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A method for removing hydrogen sulfide from water comprising the steps of:
    a. injecting chlorine into a stream of water containing hydrogen sulfide at a ratio of chlorine to sulfide of about 8–24:1;
    b. passing the chlorinated water into a column containing a bed consisting essentially of activated carbon therein;

c. allowing said chlorinated water to pass through said carbon bed to catalytically convert substantially all of the remaining hydrogen sulfide to elemental sulfur;
d. withdrawing the substantially hydrogen sulfide free finished water from said column; and
e. bumpwashing said carbon bed with water.

2. A method as in claim 1 wherein said water has a hydrogen sulfide content of from 0.1–6.0 mg/l.

3. A method as in claim 1 comprising controlling said injection of chlorine to provide a ratio of chlorine to sulfide of about 12:1.

4. A method as in claim 1 further comprising backwashing said carbon bed at about two month intervals.

5. A method as in claim 1 wherein said chlorine is gaseous.

6. A method as in claim 1 wherein said stream of water is potable.

7. A method as in claim 1 wherein said bumpwashing is conducted at about a rate of two gallons per minute per square foot of carbon bed surface area daily for about five minutes.

8. A method for removing hydrogen sulfide from water comprising the steps of:
a. injecting gaseous chlorine into a stream of potable water having a hydrogen sulfide content of from 0.1–6.0 mg/l in an amount to obtain a chlorine to sulfide ratio of about 8–24:1;
b. passing the chlorinated water through a column containing a bed consisting essentially of activated carbon therein to catalytically convert substantially all of the remaining hydrogen sulfide to elemental sulfur;
c. withdrawing the substantially hydrogen sulfide free finished water from said column; and
d. bumpwashing said carbon bed with water.

9. A method as in claim 8 comprising controlling said injection of said gaseous chlorine to obtain a chlorine to sulfide ratio of about 12:1.

10. A method as in claim 8 further comprising the step of backwashing said carbon column at about two month intervals.

11. A method as in claim 8 wherein said bumpwashing is conducted at about a rate of two gallons per minute per square foot of carbon bed surface area daily for about five minutes.

12. A method for removing hydrogen sulfide from potable water comprising the steps of:
a. injecting gaseous chlorine into a stream of potable water having a hydrogen sulfide content of from 0.1–6.0 mg/l while controlling said injection to obtain a chlorine to sulfide ratio of about 12:1, whereby substantially 90% of the sulfide is converted to sulfates;
b. passing the chlorinated water into a column containing a layer of activated carbon at least two feet deep;
c. allowing said chlorinated water to pass through said layer to catalytically convert substantially all of the remaining hydrogen sulfide to elemental sulfur;
d. withdrawing the finished water from said column; and surface cementing caused by sulfide reducing bacteria growth is substantially controlled to prevent head loss across said layer.

13. A method as in claim 12 wherein said bumpwashing is conducted at about a rate of two gallons per minute per square foot of carbon bed surface area daily for about five minutes.

* * * * *